United States Patent
Lyu et al.

(10) Patent No.: US 12,309,655 B2
(45) Date of Patent: May 20, 2025

(54) METHOD FOR WIRELESS COMMUNICATION, TERMINAL DEVICE AND NETWORK DEVICE

(71) Applicant: QUECTEL WIRELESS SOLUTIONS CO., LTD., Shanghai (CN)

(72) Inventors: Ling Lyu, Shanghai (CN); Zheng Zhao, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/927,197

(22) Filed: Oct. 25, 2024

(65) Prior Publication Data
US 2025/0081059 A1  Mar. 6, 2025

Related U.S. Application Data

(63) Continuation of application No. PCT/CN2023/116240, filed on Aug. 31, 2023.

(51) Int. Cl.
*H04W 36/08* (2009.01)
*H04W 36/00* (2009.01)

(52) U.S. Cl.
CPC ....... *H04W 36/08* (2013.01); *H04W 36/0016* (2013.01)

(58) Field of Classification Search
CPC .......................... H04W 36/08; H04W 36/0016
See application file for complete search history.

(56) References Cited

U.S. PATENT DOCUMENTS

| 2018/0049091 | A1 | 2/2018 | Wang |
| 2019/0335364 | A1* | 10/2019 | Liu ................ H04W 36/0064 |
| 2022/0078670 | A1 | 3/2022 | Kung et al. |
| 2022/0394577 | A1 | 12/2022 | Yan et al. |

FOREIGN PATENT DOCUMENTS

| GB | 2627001 A | 8/2024 |
| WO | WO 2023138669 A1 | 7/2023 |

OTHER PUBLICATIONS

Ericsson, "Lossless PDCP SN reconfiguration at HO" 3GPP TSG-RAN WG2 #97bis, R2-1702743, Spokane, USA, Apr. 3-7, 2017, 3 pages.
International Search Report and Written Opinion in International Appln. No. PCT/CN2023/116240, mailed on May 23, 2024, 13 pages (with machine English translation).
Office Action in Chinese Appln. No. 202380011769.0, mailed on Mar. 11, 2025, 12 pages (with English translation).

* cited by examiner

*Primary Examiner* — Justin Y Lee
(74) *Attorney, Agent, or Firm* — Fish & Richardson P.C.

(57) ABSTRACT

Provided are a method for wireless communication, a terminal device and a network device. One example method includes performing, by a terminal device, a layer 2 reset after the terminal device accesses a first cell successfully, wherein the first cell is a target cell in a lower layer switch.

20 Claims, 4 Drawing Sheets

METHOD FOR WIRELESS COMMUNICATION, TERMINAL DEVICE AND NETWORK DEVICE

CROSS-REFERENCE TO RELATED APPLICATIONS

This application is a continuation of International Application No. PCT/CN2023/116240, filed on Aug. 31, 2023, the disclosure of which is hereby incorporated by reference in its entirety.

TECHNICAL FIELD

The present disclosure relates to the technical field of communications, and more particularly, to a method for wireless communication, a terminal device and a network device.

BACKGROUND

In the related art, a layer 2 (L2) reset must be performed in a switch procedure, and continuous transmission of traffic data before and after the switch is achieved with a packet data convergence protocol (PDCP) as an anchor. The L2 reset may include clearing radio link control (RLC) caches. With the development of technology, separation of a central unit (CU) from distributed units (DUs) is implemented in some communication systems. Multiple DUs may be managed by one CU. Therefore, in the cell switch procedure, no replacement of a DU may occur before and after the switch. If replacement of a DU does not occur before and after the switch, the L2 reset may not be performed.

Based on this, in order to reduce the delay caused by the switch procedure, a procedure of lower layer switch (also referred to as layer 1 (L1)/L2 switch) is introduced in some communication systems to achieve fast switch.

SUMMARY

Embodiments of the present disclosure provide a method for wireless communication, a terminal device and a network device. Various aspects of the present disclosure are described below.

In a first aspect, a method for wireless communication is provided. The method includes: performing, by a terminal device, a layer 2 reset after the terminal device accesses a first cell successfully. The first cell is a target cell of a lower layer switch.

In a second aspect, a method for wireless communication is provided. The method includes: sending, by a network device, first information to a terminal device. The first information is configured to indicate: whether the terminal device needs to perform a layer 2 reset in response to the terminal device switching to a first cell, and that the terminal device performs the layer 2 reset after accessing the first cell successfully in response to the terminal device needing to perform the layer 2 reset.

In a third aspect, a terminal device is provided. The terminal device includes an execution unit configured to perform a layer 2 reset after the terminal device accesses a first cell successfully. The first cell is a target cell of a lower layer switch.

In a fourth aspect, a network device is provided. The network device includes a sending unit configured to send first information to a terminal device. The first information is configured to indicate: whether the terminal device needs to perform a layer 2 reset in response to the terminal device switching to a first cell, and that the terminal device performs the layer 2 reset after accessing the first cell successfully in response to the terminal device needing to perform the layer 2 reset.

In a fifth aspect, a terminal device is provided. The terminal device includes a memory and a processor. The memory is configured to store one or more computer programs, and the processor is configured to call the one or more computer programs stored in the memory to cause the terminal device to perform some or all of the operations in the method in the first aspect.

In a sixth aspect, a network device is provided. The network device includes a memory, a processor and a transceiver. The memory is configured to store one or more computer programs, and the processor is configured to call the one or more computer programs stored in the memory to cause the network device to perform some or all of the operations in the method in the second aspect.

In a seventh aspect, a communication system is provided. The communication system includes the terminal device and the network device described above. In another possible design, the communication system may further include other devices that interact with the terminal device or network device in the solutions in the embodiments of the present disclosure.

In an eighth aspect, a computer-readable storage medium is provided. The computer-readable storage medium stores a computer program causing at least one of a terminal device and a network device to perform some or all of the operations in the method in the various aspects described above.

In a ninth aspect, a computer program product is provided. The computer program product includes non-transitory computer-readable storage medium storing a computer program. The computer program is configured to cause at least one of a terminal device and a network device to perform some or all of the operations in the method in the various aspects described above. In some implementations, the computer program product may be a software installation package.

In a tenth aspect, a chip is provided. The chip includes a memory and a processor. The processor is configured to call a computer program from the memory to implement some or all of the operations in the method in the various aspects described above.

In the technical solutions of the embodiments of the present disclosure, unnecessary layer 2 reset can be avoided as analyzed below. If the terminal device performs a layer 2 reset before accessing a first cell and fails to access the first cell, the previously performed layer 2 reset is unnecessary in the case of success in accessing a second cell that does not require a layer 2 reset. This is because the second cell does not require the layer 2 reset, and the terminal device and the second cell can continue to interact with each other by using data in the previous RLC cache. However, since the RLC cache has been cleared before the terminal device attempts to access the first cell, even if the terminal device receives an RLC status report sent by the second cell, the terminal device is no longer able to continue transmitting data to the RLC of the second cell. In contrast, based on the embodiments of the present disclosure, the terminal device performs the layer 2 reset only after the terminal device succeeds in accessing the first cell. In other words, the terminal device does not perform the layer 2 reset in the case of failure to access the first cell. Therefore, even if the terminal device fails to access the first cell and succeeds in accessing the second cell, the terminal device may not perform the layer 2 reset according to the situation of the second cell, thereby avoiding unnecessary layer 2 reset, reducing the retransmission of packets caused by the switching, and thus improving the feeling of an user in switching.

DETAILED DESCRIPTION OF THE EMBODIMENTS

Figure 1:
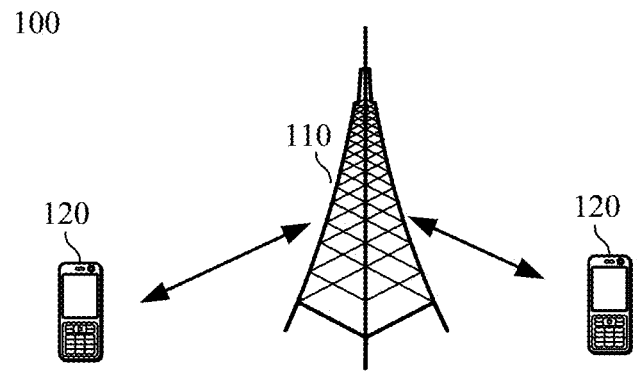
FIG. 1 is a schematic diagram of a wireless communication system applicable to embodiments of the present disclosure.

Technical solutions in the embodiments of the present disclosure are described hereinafter with reference to the accompanying drawings.
Communication System FIG. 1 is a schematic diagram of a wireless communication system 100 applicable to embodiments of the present disclosure. The wireless communication system 100 may include communication devices. The communication devices may include a network device 110 and terminal devices 120. The network device 110 may be a device communicating with the terminal devices 120.

FIG. 1 exemplarily shows one network device and two terminal devices. Optionally, the wireless communication system 100 may include a plurality of network devices and may include other numbers of terminal devices within the coverage area of each network device, which is not limited by the embodiments of the present disclosure.

Optionally, the wireless communication system 100 may also include other network entities such as a network controller and a mobile management entity, which is not limited by the embodiments of the present disclosure.

It should be understood that the technical solutions in the embodiments of the present disclosure may be applied to various communication systems, for example: a 5th generation (5G) or a new radio (NR) system, a long-term evolution (LTE) system, an LTE frequency-division duplex (FDD) system and an LTE time-division duplex (TDD) system. The technical solutions in the embodiments of the present disclosure may also be applied to future communication systems, such as a 6th generation (6G) mobile communication system and a satellite communication system.

The terminal device in the embodiments of the present disclosure may also be referred to as a user equipment (UE), an access terminal, a subscriber unit, a subscriber station, a mobile station (MS), a mobile terminal (MT), a remote station, a remote terminal, a mobile device, a user terminal, a wireless communication device, a user agent, or a user apparatus. The terminal device in the embodiments of the present disclosure may refer to a device that provides voice and/or data connectivity for users and can be used for connection between human, objects, and machines, such as a handheld device and a vehicle-mounted device having a wireless connection function. The terminal device in the embodiments of the present disclosure may be a mobile phone, a pad, a laptop, a palmtop, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in smart grid, a wireless terminal in transportation safety, a wireless terminal in smart city, a wireless terminal in smart home, or the like. In some embodiments, a UE may serve as a base station. For example, a UE may serve as a dispatch entity, which provides sidelink signals between UEs in vehicle-to-everything (V2X), device to device (D2D) or the like. For example, a cellular phone and a vehicle communicate with each other based on sidelink signals. The cellular phone and a smart home device communicate with each other without relaying communication signals through a base station.

The network device in the embodiments of the present disclosure may be a device for communication with the terminal device. The network device may also include an access network device. The access network device may provide communication coverage for a specific geographic area and may communicate with terminal devices 120 within the coverage area. The access network device may also be referred to as a wireless access network device or a base station. The access network device in the embodiments of the present disclosure may refer to a radio access network (RAN) node (or device) that allows a terminal device to access a wireless network. The access network device may broadly cover, or be replaced with, various names such as a node B (NodeB), an evolved NodeB (eNB), a next generation NodeB (gNB), a relay station, an access point, a transmitting and receiving point (TRP), a transmitting point (TP), a primary eNB (MeNB), a secondary eNB (SeNB), a multi-standard radio (MSR) node, a home base station, a network controller, an access node, a wireless node, an access point (AP), a transit node, a transceiver node, a baseband unit (BBU), a remote ratio unit (RRU), an active antenna unit (AAU), a remote radio head (RRH), a CU, a DU, a location node, and the like. The base station may be a macro base station, a micro base station, a relay node, a donor node, or the like, or a combination thereof. The base station may also refer to a communication module, a modem, or a chip configured in the above apparatus or device. The base station may also be a device that assumes the function of a base station in a mobile switching center and D2D, V2X or machine-to-machine (M2M) communication, a network-side device in a 6G network, a device that assumes the function of a base station in a future communication system, or the like. The base station may support networks of the same or different access technologies. The embodiments of the present disclosure do not limit the adopted specific technology and specific device form of the network device.

The base station may be stationary or mobile. For example, a helicopter or unmanned aerial vehicle may be configured to serve as a mobile base station, and one or more cells may move depending on the location of the mobile base station. In other examples, the helicopter or unmanned aerial vehicle may be configured to serve as a device to communicate with another base station.

Communication devices involved in a wireless communication system may include not only the access network device and the terminal devices, but also a core network element. The core network element may be implemented by a device, i.e., the core network element is a core network device. It is to be understood that the core network device may also be a network device.

The core network element in the embodiments of the present disclosure may include a network element that processes and forwards signalling and data of a user. For example, the core network device may include a core access and mobility management function (AMF), a session management function (SMF), a user-plane gateway, a location management function (LMF), and the like. The user plane gateway may be a server with functions such as mobility management, routing and forwarding of user plane data, and is generally located on the network side, such as a serving gateway (SGW) or a packet data network gateway (PGW) or a user plane function (UPF). Of course, other network elements can also be included in the core network, which are not listed here.

In some deployments, the network device in the embodiments of the present disclosure may refer to a CU or a DU, or the network device includes a CU and a DU. The gNB may also include an AAU.

The network device and the terminal devices may be deployed on land, including indoor or outdoor, hand-held, or vehicle-mounted; or may be deployed on the water surface; or may be deployed on airplanes, balloons, and satellites. In the embodiments of the present disclosure, the scenario where the network device and the terminal devices are located is not limited.

It should be appreciated that all or some of the functions of the communication devices in the present disclosure may also be implemented by software functions running on hardware, or by virtualization functions instantiated on a platform (e.g., a cloud platform).

CU and DU Separation Architecture

Separation of a CU from DUs is implemented in some wireless communication networks (e.g., a 5G communication network). Multiple DUs may be managed by one CU. For example, hundreds or thousands of DUs may be managed by one CU.

Figure 2:
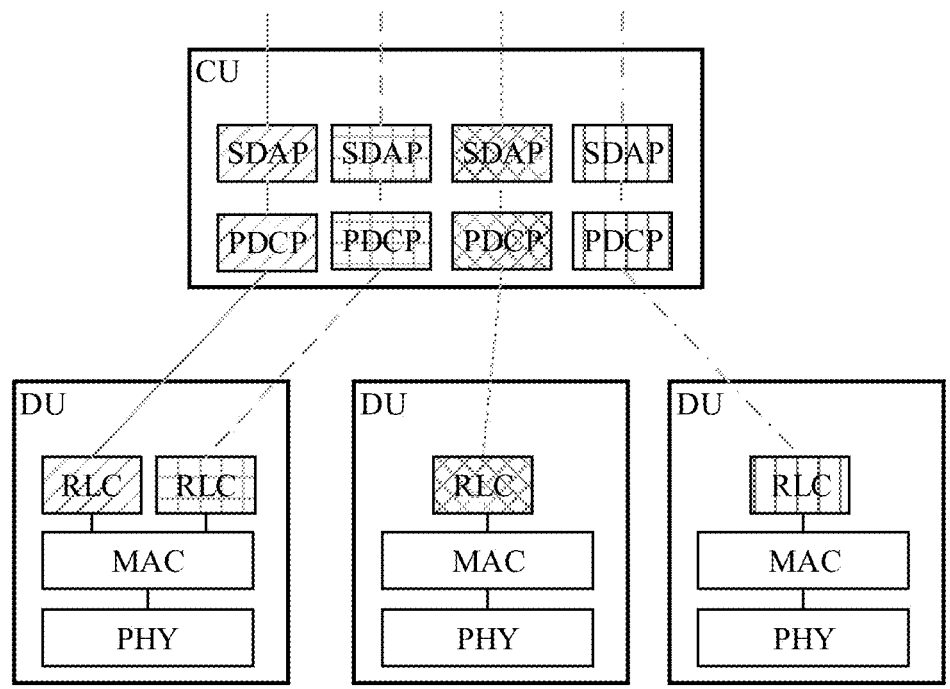
FIG. 2 is an example diagram of a protocol stack entity corresponding to 4 data bearers.

From the perspective of the communication protocol stack, control-plane entities are in the CU, and user-plane entities are in the CU and DUs. For the user-plane entities, a service data adaptation protocol (SDAP) and a packet data convergence protocol (PDCP) are included in the CU, and an RLC layer, a medium access control (MAC) layer and a physical layer (PHY) are included in the DUs. FIG. 2 shows an example diagram of protocol stack entities corresponding to four data bearers. Different fills respectively indicate the protocol stack entities corresponding to the four data bearers.

For the CU and DU separation architecture, the cell switch procedure of the terminal device may include the following three cases (Case one to Case three).

Case One: A Switch without Replacement of a DU

For case one, before and after the switching, replacement of a DU serving the terminal device does not occur, and replacement of the CU also does not occur. For the switch without replacement of the DU, RLC entities before and after the switch are within the same DU. Referring to FIG. 2, RLC entities corresponding to data bearer 1 and data bearer 2 are both within the same DU. Therefore, for case one, the terminal device may not perform a RLC reset (also referred to as L2 reset) after the switch.

Case Two: A Switch without Replacement of the CU

For case two, before and after the switch, replacement of a DU serving the terminal device occurs, and replacement of the CU does not occur. For the switch without replacement of the CU, RLC entities before and after the switch are in different DUs. With continued reference to FIG. 2, RLC entities corresponding to data bearer 3 and data bearer 4 are within different DUs. Therefore, for case two, after the switch, the terminal device may need to perform the RLC reset, whereas a PDCP reset is not need since the CU is not changed. Thus, the switch without replacement of the CU is substantially similar to an intra-base station handover in some communication systems (for example, intra eNB handover in the LTE).

Case Three: A Switch with Replacement of the CU

In case three, before and after the switch, replacement of a DU serving the terminal device occurs, and replacement of the CU also occurs. For the switch with replacement of the CU, since RLC entities before and after the switch are not in the same DU, the RLC reset is needed. In addition, since PDCPs before and after the switch are not in the same CU, a PDCP needs to be re-established within a target CU through interactions between the CUS. Thus, the switch with replacement of the CU is substantially similar to an inter-base station handover in some communication systems (for example, inter eNB handover) in the LTE).

In the related art, the L2 reset or RLC reset must be performed in the switch procedure, and continuous transmission of traffic data before and after the switch is achieved with the packet data convergence protocol (PDCP) as the anchor. However, according to the above analysis, if replacement of the DU does not occur before and after the switch, the RLC reset is not actually required. Therefore, in order to reduce the delay caused by the switch procedure, a procedure of lower layer switch is introduced in some communication systems to achieve fast switch. Lower layer switch is described below in conjunction with FIG. 3.

Lower Layer Switch

Lower layer switch may also be referred to as layer 1 (L1)/layer 2 (L2) switch.

Figure 3:
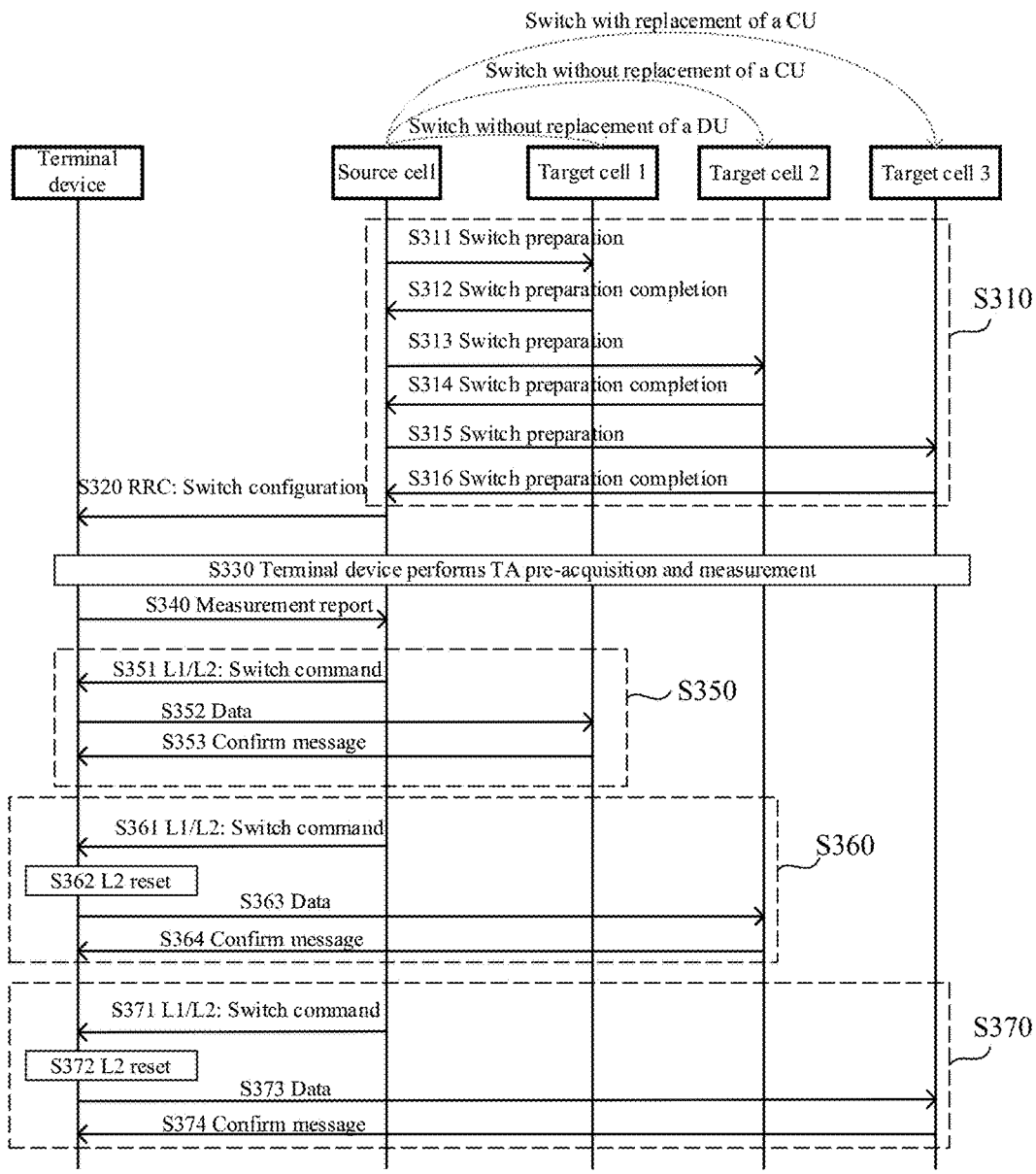
FIG. 3 is an example diagram illustrating a procedure of lower layer switch.

FIG. 3 is a schematic flowchart illustrating a lower layer switch. In FIG. 3, a source cell provides three candidate target cells for the terminal device: a target cell 1, a target cell 2, and a target cell 3.

The lower layer switch procedure shown in FIG. 3 includes operations S310 to S340.

At operation S310, the source cell and the candidate target cells perform switch preparation.

Operation S310 may include operation S311 to operation S316.

At operation S311, the source cell sends a switch preparation message to the target cell 1.

At operation S312, the target cell 1 sends back a switch preparation completion message to the source cell.

At operation S313, the source cell sends a switch preparation message to the target cell 2.

At operation S314, the target cell 2 sends back a switch preparation completion message to the source cell.

At operation S315, the source cell sends a switch preparation message to the target cell 3.

At operation S316, the target cell 3 sends back a switch preparation completion message to the source cell.

At operation S320, the source cell sends a switch configuration message to the terminal device. The switch configuration message is transmitted via radio resource control (RRC) signalling.

The switch configuration message may include configuration information of all candidate target cells (the target cell 1 to the target cell 3).

At operation S330, the terminal device performs timing advance (TA) pre-acquisition and measurement.

The terminal device may send a preamble to each respective candidate target cell of the candidate target cells to obtain a TA. The TA may be notified to the terminal device by the respective target cell. Alternatively, the respective target cell may not notify the terminal device of the TA, and the TA may be stored by the source cell.

The terminal device may also measure the respective candidate target cell to obtain a measurement result.

At operation S340, the terminal device reports the measurement result of the respective candidate target cell to the source cell.

The source cell may determine a target cell that needs to be switched to by the terminal device based on the measurement result, and inform the terminal device of this information via lower layer signalling. Exemplarily, the method shown in FIG. 3 may include operation S350, S360, or S370.

If the source cell determines that the terminal device switches to the target cell 1, the method shown in FIG. 3 may include operation S350.

Operation S350 may include operation S351 to operation S353.

At operation S351, the source cell sends a switch command to the terminal device via L1/L2 signalling. The switch command is configured to indicate that the terminal device needs to switch to the target cell 1.

At operation S352, the terminal device sends uplink data to the target cell 1 and at S353 receives a confirm message from the target cell 1. At this point, the switch procedure ends.

In the switch procedure, if the terminal device acquires a TA of the target cell 1 in advance, and the network device corresponding to the target cell 1 has assigned a configured grant (CG) to the terminal device, the terminal device may directly send uplink data. If the terminal device does not acquire the TA of the target cell 1 in advance, or the network device corresponding to the target cell 1 does not assign the CG to the terminal device, the terminal device acquires uplink resources and the TA through a random access procedure and sends uplink data.

If the source cell determines that the terminal device switches to the target cell 2, the method shown in FIG. 3 may include operation S360.

Operation S360 May Include Operation S361 to Operation S364

At operation S361, the source cell sends a switch command to the terminal device via L1/L2 signalling. The switch command is configured to indicate that the terminal device needs to switch to the target cell 2.

At operation S362, the terminal device performs L2 reset. At operation S363 the terminal device sends uplink data to the target cell 2 and at S364 receives a confirm message from the target cell 2. At this point, the switch procedure ends.

In the switch procedure, if the terminal device acquires a TA of the target cell 2 in advance, and the network device corresponding to the target cell 2 has assigned a CG to the terminal device, the terminal device may directly send uplink data. If the terminal device does not acquire the TA of the target cell 2 in advance, or the network device corresponding to the target cell 2 does not assign the CG to the terminal device, the terminal device acquires uplink resources and the TA through a random access procedure and sends uplink data.

If the source cell determines that the terminal device switches to the target cell 3, the method shown in FIG. 3 may include operation S370.

Operation S370 May Include Operation S371 to Operation S374

At operation S371, the source cell sends a switch command to the terminal device via L1/L2 signalling. The switch command is configured to indicate that the terminal device needs to switch to the target cell 3.

At operation S372, the terminal device performs L2 reset. At operation S373 the terminal device sends uplink data to the target cell 3 and at S374 receives a confirm message from the target cell 3. At this point, the switch procedure ends.

In the switch procedure, if the terminal device acquires a TA of the target cell 3 in advance, and the network device corresponding to the target cell 3 has assigned a configured grant (CG) to the terminal device, the terminal device may directly send uplink data. If the terminal device does not acquire the TA of the target cell 3 in advance, or the network device corresponding to the target cell 3 does not assign the CG to the terminal device, the terminal device acquires uplink resources and the TA through a random access procedure and sends uplink data.

In the method shown in FIG. 3, in response to the terminal device switching to the target cell 1, it is a switch without replacement of a DU; in response to the terminal device switching to the target cell 2, it is a switch with replacement of a DU; and in response to the terminal device switching to the target cell 3, it is a switching replacement of a CU. Therefore, in response to the terminal device switching to the target cell 1, the terminal device does not need to perform the L2 reset; and in response to the terminal device switching to the target cell 2 or the target cell 3, the terminal device needs to perform the L2 reset.

FIG. 3 illustrates the lower layer switch procedure in which the source cell determines which candidate target cell the terminal device switches to. Similarly, the lower layer switch may be applied in a conditional switch procedure. Similar to the procedure shown in FIG. 3, in the conditional switch procedure, the terminal device may acquire configuration information of one or more quasi-target cells in advance and self-select, based on measurement results, one target cell to switch.

It should be noted that in the conditional switch procedure, in the case where multiple quasi-target cells are pre-configured, the terminal device may select another quasi-target cell (e.g., a target cell 3) to access if the terminal device selects the target cell 2 to access but the access fails. In this case, the terminal device needs to perform the L2 reset when switching to either the target cell 2 or the target cell 3.

Figure 4:
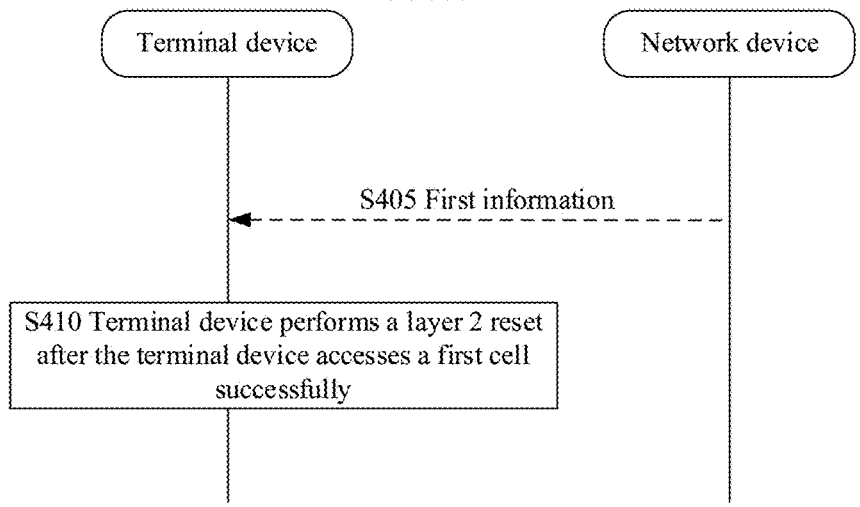
FIG. 4 is a schematic flowchart of a wireless communication method according to embodiments of the present disclosure.

The present disclosure optimizes the lower layer switch procedure. FIG. 4 is a schematic structural diagram of a wireless communication method according to embodiments of the present disclosure.

The method shown in FIG. 4 may be performed by the terminal device. The method shown in FIG. 4 includes operation S410.

At operation S410, the terminal device performs a layer 2 reset after the terminal device accesses a first cell successfully.

The first cell may be a target cell of a lower layer switch. For example, the first cell may be a target cell indicated by a switch command sent by a network device. That is, the first cell may be a target cell determined by the network device. Alternatively, the first cell may be a target cell self-selected by the terminal device during the conditional switch procedure. That is, the first cell may be a target cell self-determined by the terminal device.

As mentioned above, the layer 2 reset performed by the terminal device may be understood as a reset of the RLC. The reset of the RLC may refer to clearing RLC caches. For example, the layer 2 reset may include: clearing sender RLC caches; and/or, clearing receiver RLC caches.

As can be seen from operation S410, the terminal device performs the layer 2 reset only after the terminal device has successfully accessed the first cell. In other words, in the case where the terminal device fails to access the first cell, the terminal device may not perform the layer 2 reset.

In the technical solution, unnecessary layer 2 reset can be avoided as analyzed below. If the terminal device performs a layer 2 reset before accessing the first cell and fails to access the first cell, the previously performed layer 2 reset is unnecessary in the case of success in accessing the second cell that does not require a layer 2 reset. This is because the second cell does not require the layer 2 reset, i.e., the terminal device and the second cell can continue to interact with each other by using data in the previous RLC cache. However, since the RLC caches have been cleared before the terminal device attempts to access the first cell, it is difficult to continue transmitting data, or data retransmission is required between the terminal device and the RLC of the second cell. For example, with respect to uplink transmissions, an RLC status report sent by the second cell may indicate that the second cell requires retransmission of some RLC service data units (SDUs), and in the case where the RLC caches are not cleared, the terminal device may find these RLC SDUs from the RLC caches and retransmit them to the second cell. However, in the case where the RLC caches are cleared, the terminal device cannot find these RLC SDUs from the RLC caches and cannot transmit these RLC SDUs. For another example, with respect to downlink transmissions, if the layer 2 reset is not performed, the terminal device may send an RLC status report to the second cell and request that a number of RLC SDUs or RLS SDU segments be retransmitted, thereby avoiding excessive retransmission of data. However, in the case where the layer 2 reset is performed, it is not possible to avoid excessive retransmission of data based on this technical solution. Based on the present disclosure, the terminal device performs the layer 2 reset only after the terminal device has successfully accessed the first cell. In other words, the terminal device does not perform the layer 2 reset in the case of failure to access the first cell. Therefore, even if the terminal device fails to access the first cell and succeeds in accessing the second cell, the terminal device may not perform the layer 2 reset according to the situation of the second cell, thereby avoiding unnecessary layer 2 reset, reducing the retransmission of packets caused by the switching, and thus improving the feeling of an user in switching.

In some embodiments, in the case where the terminal device determines that the layer 2 reset needs to be performed, the terminal device may perform operation S410. For example, the terminal device may determine: whether the layer 2 reset needs to be performed in response to switching to the first cell. If the layer 2 reset does not need to be performed, the terminal device does not perform the layer 2 reset; and if the layer 2 reset needs to be performed, the terminal device performs the layer 2 reset (i.e., performing operation S410). The terminal device may determine whether the layer 2 reset needs to be performed based on first information in operation S405 described below.

It should be noted that whether or not the layer 2 reset needs to be performed may be at a cell level. That is, for different cells, whether the terminal device needs to perform a layer 2 reset may be different. For example, in the case where switching to the first cell is a switch without replacement of a DU, the terminal device does not need to perform a layer 2 reset. Alternatively, in the case where switching to the first cell is a switch with replacement of a DU and without replacement of a CU, the terminal device needs to perform a layer 2 reset. Alternatively, in the case where switching to the first cell is a switch with replacement of a CU, the terminal device needs to perform a layer 2 reset.

It is noted that whether to replace a DU may be one of conditions for whether a layer 2 reset needs to be (or does not need to be) performed. The conditions for whether the layer 2 reset needs to be performed may include other conditions. Where some or all of the conditions for whether the layer 2 reset needs to be performed are satisfied, it may be determined that the layer 2 reset needs to be performed. Alternatively, where some or all of the conditions for whether or not the layer 2 reset needs to be performed are satisfied, it may be determined that the layer 2 reset does not need to be performed. For example, in the case where switching to the first cell is a switch with replacement of a DU, the terminal device may not need to perform a layer 2 reset if two DUs before and after the replacement can share storage space, for example, via a high-capacity transmission channel or a cloud connection.

In some embodiments, the method shown in FIG. 4 may further include operation S405. Operation S405 may be performed by the terminal device and the network device. The network device may be a network device corresponding to a source cell of the terminal device.

At operation S405, the network device sends first information to the terminal device.

The first information may be configured to indicate whether the terminal device needs to perform a layer 2 reset in response to switching to a first cell.

Based on the first information, the terminal device may determine whether the layer 2 reset needs to be performed in the case of switching to the first cell, and thus determine whether the layer 2 reset needs to be performed after the terminal device has successfully accessed the first cell.

In some embodiments, the first information may be indicated by explicit means.

Exemplarily, the first information may include a first bit, a first Boolean value, or a first enumeration value corresponding to the first cell. For example, a first bit of 0 may indicate that switching to the first cell does not require performing a layer 2 reset, and a first bit of 1 may indicate that switching to the first cell requires performing a layer 2 reset. Alternatively, a first bit of 1 may indicate that switching to the first cell does not require performing a layer 2 reset, and a first bit of 0 may indicate that switching to the first cell requires performing a layer 2 reset. For example, a first Boolean value of "true" may indicate that switching to the first cell does not require performing a layer 2 reset, and a first Boolean value of "false" may indicate that switching to the first cell requires performing a layer 2 reset. Alternatively, a first Boolean value of "false" may indicate that switching to the first cell does not require performing a layer 2 reset, and a first Boolean value of "true" may indicate that switching to the first cell requires performing a layer 2 reset.

For another example, the first enumeration value may indicate that "require performing a layer 2 reset" or "not require performing a layer 2 reset."

Exemplarily, for conditional switching, the network device may divide quasi-target cells into a first group and a second group. The first group may include one or more cells requiring a L2 reset to be performed, and the second group may include one or more cells not requiring a L2 reset to be performed. In the first and second groups, one or more cells may be quasi-target cells of the terminal device.

In some embodiments, the first information may be indicated implicitly.

Exemplarily, the first information may be indicated by a conditional switching condition of the first cell. The terminal device may determine whether an L2 reset needs to be performed for the first cell based on the conditional switching condition configured by the network device for the first cell.

Optionally, in the case where the L2 reset needs to be performed for the first cell, the network device may set the conditional switching condition for the first cell to a first condition that is more difficult to satisfy, and in the case where the L2 reset does not need to be performed for the first cell, the network device may set the conditional switching condition for the first cell to a second condition that is easier to satisfy. Optionally, the first condition may include that a RSRP of the first cell reaches a first value, and the first cell satisfies the conditional switching condition; and the second condition may include that the RSRP of the first cell reaches a second value, and the first cell satisfies the conditional switching condition, where the first value is greater than the second value.

Optionally, for all the quasi-target cells, the network device may configure a plurality of conditional switching conditions. Alternatively, a plurality of switching conditions may be configured for quasi-target cells having frequency bands in a frequency range (FR) 1. Alternatively, a plurality of switching conditions may be configured for quasi-target cells having frequency bands in a FR2. The plurality of switching conditions may be related to the first information. For example, the plurality of switching conditions may include the first condition and the second condition described above.

Exemplarily, the first information may indicate whether the terminal device needs to perform a layer 2 reset by the ranking of the first cell in a plurality of cells. The plurality of cells may be cells to which the terminal device is capable of attempting a lower layer switch. For example, the plurality of cells may be indicated by a cell list. For cells in the cell list, the first half may be cells that do not require performing an L2 reset, and the second half may be cells that require performing an L2 reset. Alternatively, for the cells in the cell list, the first half may be cells that require performing an L2 reset, and the second half may be cells that do not require performing an L2 reset.

In some embodiments, the network device may send second information to the terminal device. The second information may include information of a plurality of cells. The plurality of cells may be cells to which the terminal device is capable of attempting a lower layer switch.

From the above, it can be seen that in the lower layer switch procedure, the network device or terminal device can determine the target cell for switching based on the L1/L2 measurement result of the terminal device. The L1/L2 measurement result is not filtered by smoothing, and thus fluctuates greatly. In this case, the switching failure probability based on the L1/L2 measurement result is higher. If the network device indicates to the terminal device only one cell to which the terminal device is capable of attempting a lower layer switch (e.g., the technical solution that includes only one cell in the switch command in the related art), the terminal device can only perform cell reselection after switching to the cell fails, and initiate a radio link re-establishment. This results in a lower switching success rate and a longer interruption time of data transmission. Based on the present disclosure, the terminal device may sequentially attempt to switch to a plurality of cells indicated by the second information, thereby increasing the switching success rate and reducing the interruption time of data transmission.

In some embodiments, the second information may be carried in a switch command. That is, the switch command may include a plurality of cells. The plurality of cells may be cells to which the terminal device is capable of performing L1/L2 switch. The plurality of cells indicated by the switch command may be cells that satisfy switching conditions. That is, the L/L2 measurements of the plurality of cells indicated by the switch command all satisfy the switching requirements.

In some embodiments, the second information may be carried in a switch configuration message. In other words, the terminal device may select a cell indicated in the switch configuration message to initiate random access. Since a candidate target cell indicated in the switch configuration message is a cell that has interacted with the source cell, the access of the terminal device to the candidate target cell indicated in the switch configuration message may also be performed in accordance with the switch procedure. With continued reference to the scenario shown in FIG. 3, based on the present disclosure, the target cell 1, the target cell 2, and the target cell 3 included in the switch configuration message in operation S320 may all be cells to which the terminal device is capable of attempting to switch. This is because, in operation S310, the switch preparation is performed between the source cell and each of the target cell 1, the target cell 2, and the target cell 3.

In some embodiments, the second information may be carried in a switch indication. The switch indication may be L1/L2 signalling. The switch indication may be configured to indicate one or more target cells.

It is noted that the second information may be carried in the switch command alone or in at least two of the switch command, the switch configuration message, and the switch indication.

In the case where the second information is carried in the switch command alone, the switch command may indicate a plurality of cells. If the terminal device fails in its attempt to access the plurality of cells indicated by the switch command, the terminal device may perform cell reselection and RRC re-establishment.

In the case where the second information is carried in the switch command and the switch configuration message, the switch command may indicate one or more cells and the switch configuration message may indicate one or more cells. All of the cells indicated in the switch command and the switch configuration message may form a plurality of cells indicated by the second information. For example, the switch command may include only one cell. The terminal device may preferentially attempt to access a cell indicated in the switch command. In the case where access to the cell indicated in the switch command fails, the terminal device may select a cell that is indicated in the switch configuration message but not included in the switch command, and initiate random access to the selected cell. Alternatively, the switch command may include a plurality of cells. The terminal device may preferentially attempt to access the plurality of cells indicated by the switch command. In the case where access to each of the plurality of cells indicated in the switch command fails, the terminal device may select a cell that is indicated in the switch configuration message but is not included in the switch command, and initiate random access to the selected cell.

A description is given below by taking FIG. 5 as an example. The method shown in FIG. 5 includes operation S510 and operation S520.

At operation S510, the network device sends a switch configuration message to the terminal device.

The switch configuration message indicates five cells. The five cells are: a cell A, a cell B, a cell C, a cell D, and a cell E, respectively.

At operation S520, the network device sends a switch command to the terminal device.

The switch command indicates three cells. The three cells are: the cell B, the cell C, and the cell E, respectively.

Figure 5:
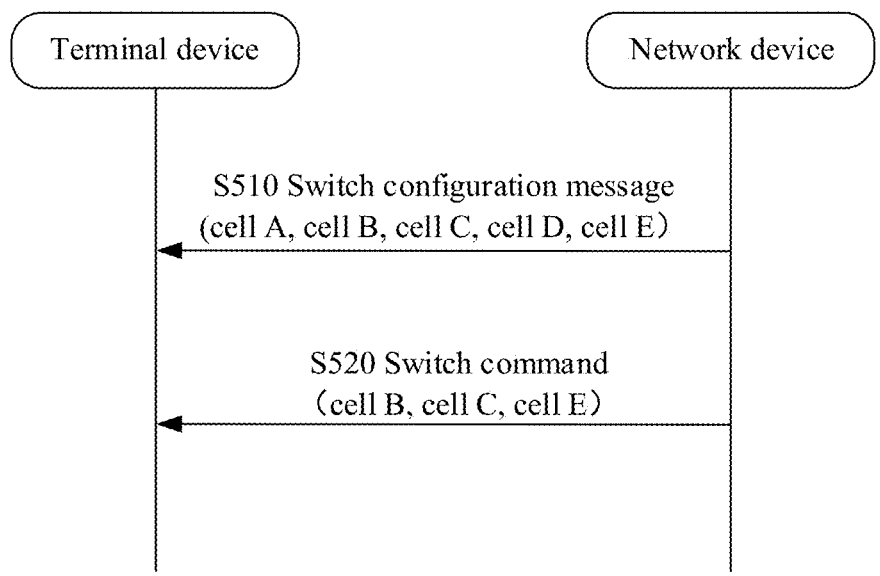
FIG. 5 is a schematic flowchart of another wireless communication method according to embodiments of the present disclosure.

For the scenario shown in FIG. 5, in the case where the terminal device fails in its attempt to access the cell B, the cell C, and the cell E, the terminal device may perform cell reselection and RRC re-establishment. Alternatively, in the case where the terminal device fails in its attempts to access the cell B, the cell C, and the cell E, the terminal device may attempt to access the cell A or the cell D.

Optionally, at operation S520, the switch command may indicate only one cell. For example, the one cell indicated by the switch command may be the cell B. In the case where the terminal device fails in its attempt to access the cell B, the terminal device may attempt to access the cell A, the cell C, the cell D, or the cell E.

It is to be noted that for the plurality of cells indicated by the second information, the terminal device may count switching parameters alone or together with the cells in the related art. The switching parameters may include one or more of the following: a number of switches, switch delay, statistical information and the like. For example, for the plurality of cells indicated by the second information, the statistical information may include one or more of the following: a probability of successfully switching into a first cell of the plurality of cells, a number of times of successfully switching into the first cell of the plurality of cells, a frequency of successfully switching into the first cell of the plurality of cells, a probability of successfully switching into a non-first cell of the plurality of cells, a number of times successfully switching into the non-first cell in the plurality of cells, and a frequency of successfully switching into the non-first cell in the plurality of cells. For another example, the statistical information may include one or more of the following: a number of times of successfully switching into a cell in the plurality of cells that does not require performing a layer 2 reset, a probability of successfully switching into a cell in the plurality of cells that does not require performing a layer 2 reset, a frequency of successfully switching into a cell in the plurality of cells that does not require performing a layer 2 reset, a number of times of successfully switching into a cell in the plurality of cells that requires performing a layer 2 reset, a probability of successfully switching into a cell in the plurality of cells that requires performing a layer 2 reset, a frequency of successfully switching into a cell in the plurality of cells that requires performing a layer 2 reset.

The terminal device may sequentially attempt to access the plurality of cells indicated by the second information in a certain order. The following describes the access order in which the terminal device accesses the plurality of cells.

In some embodiments, the plurality of cells indicated by the second information may form a cell list. The terminal device may access cells sequentially in a listed order of the cells in the cell list. That is, the terminal device may first attempt to access a first cell in the cell list; if accessing the first cell fails, the terminal device may attempt to access a second cell in the cell list; if accessing the second cell fails, the terminal device may attempt to access a third cell in the cell list . . . , until the terminal device attempts to access the last cell in the cell list. With continued reference to FIG. 5, taking the second information carried only in the switch command as an example, the terminal device may attempt to access the cell B, the cell C, and the cell E sequentially in the recited order. That is, the terminal device may first attempt to access the cell B; if accessing the cell B fails, the terminal device may attempt to access the cell C; if accessing the cell C fails, the terminal device may attempt to access the cell E.

In some embodiments, the terminal device may preferentially attempt to switch to a cell having a high priority in the plurality of cells indicated by the second information. For example, in the case where a priority associated with the first cell is higher than or equal to a priority associated with the second cell, the terminal device may first attempt to access the first cell. If accessing the first cell fails, the terminal device may then attempt to access the second cell.

The priority associated with the first cell may be determined based on one or more of the following information: whether switching to the first cell requires performing a layer 2 reset, a signal strength of the first cell, a ranking of the first cell in the plurality of cells included in the second information.

For example, a priority associated with a cell that does not require performing a layer 2 reset may be higher than a priority associated with a cell that requires performing a layer 2 reset. In other words, the terminal device may attempt to access a cell that does not require performing a layer 2 reset first, and then a cell that requires performing a layer 2 reset according to the principle of "attempting to access a cell that does not require performing a layer 2 reset first." With continued reference to FIG. 5, if the cell B and the cell E are cells that do not require performing a layer 2 reset, and the cell C is a cell that requires performing a layer 2 reset, the terminal device may attempt to access the cell B, the cell E, and the cell C sequentially in the recited order.

As another example, a priority associated with a cell having a higher signal strength may be higher than a priority associated with a cell having a lower signal strength. That is, the terminal device may attempt to access the cells one by one in an order from a higher signal strength to a lower signal strength in accordance with the measured signal strength.

As another example, in the plurality of cells included in the second information, a priority associated with a cell of a higher ranking may be higher than a priority associated with a cell of a lower ranking. That is, the terminal device may attempt to access a plurality of cells included in the second information sequentially according to rankings of the plurality of cells.

The above embodiments may be implemented individually or in combination. For example, in the case where two cells have the same priority, the terminal device may attempt to access the two cells in the listed order of the two cells in the cell list.

In some embodiments, the terminal device may send third information to the network device. The third information may be configured to indicate that the terminal device has not performed a layer 2 reset before attempting to access the first cell. Alternatively, the third information is configured to indicate that the terminal device has not performed a layer 2 reset before successfully accessing the first cell.

Exemplarily, the third information may be carried in one or more of: an RLC status report, a media access layer control control element (MAC CE), an RRC message, and a message 3 (msg3). In the case where the third information is carried on the MAC CE, the third information may be carried in one or more bits of a MAC sub-header. In the case where the third information is carried in the RRC message, the third information may be carried in a parameter in the RRC message. In the case where the third information is carried in the msg3, the third information indicated by the physical layer may be transmitted by means of physical layer puncturing in the msg3.

It is noted that in the case where the third information is carried in the RLC status report, by means of the RLC status report, the terminal device may not only inform the network device that the terminal device has not performed a layer 2 reset before attempting to access the first cell, but also inform the network device of the terminal device's RLC status.

For example, if the terminal device has acquired CG resources allocated by the first cell and has acquired a TA, the terminal device may send an RLC status report when attempting to access the first cell. If the terminal device succeeds in accessing the first cell and the network device knows that the terminal device needs to perform a layer 2 reset during this switch procedure, the network device may ignore this RLC status report. After performing the layer 2 reset, continuous transmission of packets may be guaranteed by the PDCP layer. If the terminal device fails to access the first cell, the terminal device may not perform the layer 2 reset and continues to look for and attempt to access the next cell.

The method embodiments of the present disclosure are described in detail above, and device embodiments of the present disclosure are described in detail below. It should be understood that the description of the method embodiments and the description of the device embodiments correspond to each other, and therefore, parts not described in detail may be referred to the previous method embodiments.

Figure 6:
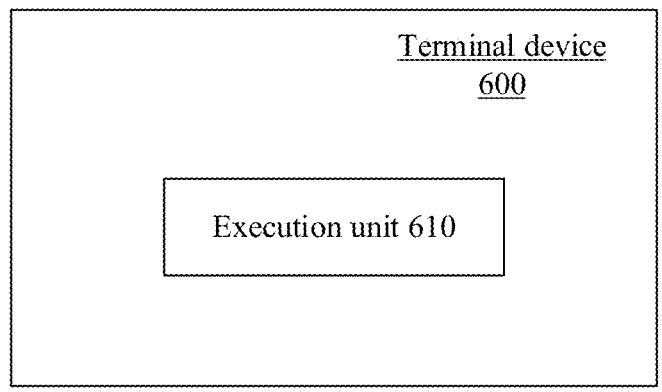
FIG. 6 is a schematic structural diagram of a terminal device according to embodiments of the present disclosure.

FIG. 6 is a schematic structural diagram of a terminal device 600 according to embodiments of the present disclosure. The terminal device 600 includes an execution unit 610.

The execution unit 610 is configured to perform a layer 2 reset after the terminal device accesses a first cell successfully. The first cell is a target cell of a lower layer switch.

In some embodiments, the execution unit 610 is configured to perform a layer 2 reset in a case where the terminal device determines that the layer 2 reset needs to be performed.

In some embodiments, the terminal device 600 is further configured to receive first information, where the first information is configured to indicate whether the terminal device needs to perform a layer 2 reset in response to the terminal device switching to the first cell.

In some embodiments, the first information is indicated by a conditional switching condition of the first cell. Additionally or alternatively, the first information is indicated by a ranking of the first cell in a plurality of cells, where the plurality of cells are cells to which the terminal device is capable of attempting a lower layer switch.

In some embodiments, the terminal device 600 is further configured to receive second information, where the second information includes information of a plurality of cells, where the plurality of cells includes the first cell and are cells to which the terminal device is capable of attempting a lower layer switch.

In some embodiments, the second information is carried in one or more of the following messages: a switch configuration message, a switch command, and a switch indication.

In some embodiments, a cell to which the terminal device preferentially attempts to switch is a cell having a high priority in the plurality of cells.

In some embodiments, a priority associated with the first cell is determined based on one or more of the following information: whether switching to the first cell requires performing a layer 2 reset; a signal strength of the first cell; and a ranking of the first cell in the plurality of cells included in the second information.

In some embodiments, the terminal device 600 is further configured to send a third information, where the third information is configured to indicate that the terminal device has not performed a layer 2 reset before attempting to access the first cell.

In some embodiments, the third information is carried in one or more of: a MAC CE, an RRC message, a message 3, and an RLC status report.

Figure 8:
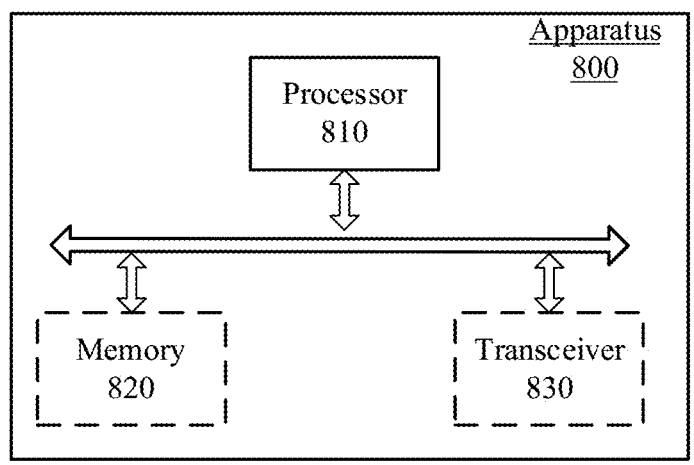
FIG. 8 is a schematic structural diagram of an apparatus for communication according to embodiments of the present disclosure.

In optional embodiments, the execution unit 610 may be a processor 810. The terminal device 600 may further include a memory 820 and a transceiver 830, as shown in FIG. 8.

Figure 7:
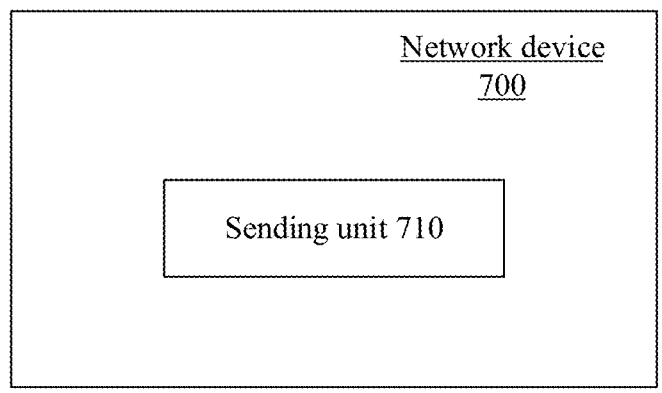
FIG. 7 is a schematic structural diagram of a network device according to embodiments of the present disclosure.

FIG. 7 shows a network device 700 according to embodiments of the present disclosure. The network device 700 includes a sending unit 710.

The sending unit 710 is configured to send first information to the terminal device, where the first information is configured to indicate: whether the terminal device needs to perform a layer 2 reset in response to the terminal device switching to the first cell, and that the terminal device performs the layer 2 reset after accessing the first cell successfully in response to the terminal device needing to perform the layer 2 reset.

In some embodiments, the first information is indicated by a conditional switching condition of the first cell. Additionally or alternatively, the first information is indicated by a ranking of the first cell in a plurality of cells, where the plurality of cells are cells to which the terminal device is capable of attempting a lower layer switch.

In some embodiments, the network device 700 is further configured to send second information to the terminal device. The second information includes information of a plurality of cells, where the plurality of cells include the first cell, and are cells to which the terminal device is capable of attempting a lower layer switch.

In some embodiments, the second information is carried in one or more of the following messages: a switch configuration message, a switch command, and a switch indication.

In some embodiments, a cell to which the terminal device preferentially attempts to switch is a cell having a high priority in the plurality of cells.

In some embodiments, a priority associated with the first cell is determined based on one or more of the following information: whether switching to the first cell requires performing a layer 2 reset; a signal strength of the first cell; and a ranking of the first cell in the plurality of cells included in the second information.

In some embodiments, the network device 700 is further configured to receive third information, where the third information is configured to indicate that the terminal device has not performed a layer 2 reset before attempting to access the first cell.

In some embodiments, the third information is carried in one or more of: a MAC CE, an RRC message, a message 3, and an RLC status report.

In optional embodiments, the transmitting unit 710 may be a transceiver 830. The network device 700 may further include a processor 810 and a memory 820, as shown in FIG. 8.

FIG. 8 is a schematic structural diagram of an apparatus for communication according to embodiments of the present disclosure. Dotted lines in FIG. 8 indicate that the unit or module is optional. The apparatus 800 may be configured to implement the methods described in the preceding method embodiments. The apparatus 800 may be a chip, a terminal device or a network device.

The apparatus 800 may include one or more processors 810. The processor 810 may support the apparatus 800 in implementing the method described in the preceding method embodiments. The processor 810 may be a general purpose processor or an application-specific processor. For example, the processor may be a central processing unit (CPU). Alternatively, the processor may be a general processor, a digital signal processor (DSP), an application specific integrated circuit (ASIC), a field programmable gate array (FPGA) or another programmable logic device, a discrete gate or transistor logic device, or a discrete hardware component, or the like. The general-purpose processor may be a microprocessor or any customary processor or the like.

The apparatus 800 may further include one or more memories 820. The memory 820 has stored thereon a program that is executable by the processor 810 to cause the processor 810 to perform the method described in the preceding method embodiments. The memory 820 may be separate from the processor 810 or integrated within the processor 810.

The apparatus 800 may further include a transceiver 830. The processor 810 may communicate with another device or a chip by the transceiver 830. For example, the processor 810 may transmit data to, or receive data from, another device or a chip by the transceiver 830.

Some embodiments of the present disclosure further provide a computer-readable storage medium configured to store a program. The computer-readable storage medium may be applied to a terminal device or a network device according to the embodiments of the present disclosure, and the program causes a computer to perform the method performed by the terminal device or the network device according to the respective embodiments of the present disclosure.

Some embodiments of the present disclosure further provide a computer program product. The computer program product includes a program. The computer program product may be applied to a terminal device or a network device according to the embodiments of the present disclosure, and the more program causes a computer to perform the method performed by the terminal device or the network device according to the respective embodiments of the present disclosure.

Some embodiments of the present disclosure further provide a computer program. The computer program may be applied to a terminal device or a network device according to the embodiments of the present disclosure, and the computer program causes a computer to perform the method performed by the terminal device or the network device according to the respective embodiments of the present disclosure.

It should be understood that the terms "system" and "network" in the specification are generally exchanged. Further, the terms used herein are for the purpose of describing particular embodiments only and are not intended to limit the present disclosure. The terms such as "first," "second," "third," "fourth," and the like in the specifications, claims and the accompanying drawings of the present disclosure are intended to distinguishing different objects but are not intended to define a specific sequence. In addition, terms "comprise," "include," and variations thereof are intended to define a non-exclusive meaning.

In the embodiments of the present disclosure, "an indication" mentioned in the specification may be a direct indication, an indirect indication, or an association. By way of example, A indicates B, which can mean that A directly indicates B, e.g., B can be obtained by A; can also indicate that A indicates B indirectly, for example A indicates C, and B can be obtained by C; it can also be shown that there is an association between A and B.

In the embodiments of the present disclosure, "B corresponding to A" means that B is associated with A, from which B may be determined. However, it should also be understood that determining B from A does not mean determining B from A alone, and B may also be determined from A and/or other information.

In the embodiments of the present disclosure, the term "correspond" or derivatives thereof mean that there is a direct correspondence or an indirect correspondence between the two, that there is a correlation between the two, and that there is a relationship between indicating and being indicated, configuring and being configured, or the like.

In embodiments of the present disclosure, "predefined" or "pre-configured" may be implemented by pre-storing a corresponding code, table, or other means that may be used to indicate relevant information in a device (e.g., including a terminal device and a network device), and the present disclosure does not limit the specific implementation thereof. For example, the term "predefined" may refer to "defined in the protocol."

In embodiments of the present disclosure, the term "protocol" may refer to a standard protocol in the field of communications, and may include, for example, the LTE protocol, the NR protocol, and related protocols used in future communication systems, without limitation.

In the embodiments of the present disclosure, the term "and/or" is merely an association relationship for describing associated objects, which represents that there may exist three types of relationships, for example, A and/or B may represent three situations: only A exists, both A and B exist, and only B exists. In addition, the forward-slash symbol "/" generally represents an "or" relationship between associated objects before and after the symbol.

In the embodiments of the present disclosure, "include" may refer to direct inclusion or indirect inclusion. Optionally, the "include" referred to in embodiments of the present disclosure may be replaced with "indicate" or "configured to determine". For example, A includes B, which may be replaced with A indicates B, or A is configured to determine B.

It should be understood that in various embodiments of the present disclosure, the sequence numbers of the above various processes or steps do not denote a preferred sequence of performing the processes or steps; and the sequence of performing the processes and steps should be determined according to the functions and internal logics thereof, which shall not cause any limitation to the implementation process of the embodiments of the present disclosure.

In the several embodiments provided in the present disclosure, it should be understood that the disclosed system, apparatus and method may be practiced in other manners. The above described device embodiments are merely illustrative. For example, the unit division is merely logical function division and may be other divisions in actual practice. For example, multiple units or components may be combined or integrated into another device, or some features can be ignored or not performed. In addition, the displayed or discussed mutual couplings or direct couplings or communication connections may be implemented through some interfaces. The indirect couplings or communication connections between the devices or units may be implemented in electronic, mechanical or other forms.

The units which are described as separate components may be physically separated or may be not physically separated, and the components which are illustrated as units may be or may not be physical units, that is, the components may be located in the same location or may be distributed into a plurality of network units. Some or all of the units may be selected according to actual needs to achieve the objectives of the solutions of the embodiments.

In addition, functional units in the embodiments of the present disclosure may be integrated into one processing unit, or each of the units may exist along physically, or two or more units may be integrated into one unit.

In the above embodiments, the technical solutions may be totally or partially practiced by software, hardware, firmware or any combination thereof. During practice by software, the technical solutions may be totally or partially implemented in the form of a computer program product. The computer program product includes one or a plurality of computer-executable instructions. The computer program instructions, when loaded and executed on a computer, may cause the computer to totally or partially perform the procedures or functions in the embodiments of the present disclosure. The computer may be a general computer, a dedicated computer, a computer network, or another programming device. The computer-executable instructions may be stored in a computer-readable storage medium, or transferred from one computer-readable storage medium to another. For example, the computer-executable instructions may be transmitted from one website, computer, server or data center to another in a wired fashion, for example, a coaxial cable, an optical fiber, a digital subscriber line (DSL) or a wireless fashion, for example, an infrared ray, a radio, a microwave or the like. The computer-readable storage medium may be any available medium that is accessible or a data storage device such as a server, a data center or the like integrated with one or a plurality of available media. The available medium may be a magnetic medium, for example, a floppy disk, a hard disk or a magnetic tape, an optical medium, for example, a digital versatile disc (DVD), or a semiconductor medium, for example, a solid state disk (SSD) or the like.

The above embodiments are used only for illustrating the present disclosure, but are not intended to limit the protection scope of the present disclosure. Various modifications and replacements readily derived by those skilled in the art within technical disclosure of the present disclosure shall fall within the protection scope of the present disclosure. Therefore, the protection scope of the present disclosure is subject to the appended claims.

What is claimed is:

1. A method for wireless communication, comprising:
   receiving, by a terminal device, second information, wherein the second information includes information of a plurality of cells, and the plurality of cells includes a first cell, the plurality of cells are cells to which the terminal device is capable of attempting a lower layer switch; and
   performing, by the terminal device, a layer 2 reset after the terminal device accesses the first cell successfully, wherein the first cell is a target cell in a lower layer switch.

2. The method according to claim 1, wherein performing, by the terminal device, the layer 2 reset comprises:
   in response to the terminal device determining that the layer 2 reset needs to be performed, performing, by the terminal device, the layer 2 reset.

3. The method according to claim 2, wherein the method further comprises:
   receiving, by the terminal device, first information;
   wherein the first information indicates whether the terminal device needs to perform the layer 2 reset in response to switching to the first cell.

4. The method according to claim 3, wherein the first information is indicated by at least one of a conditional switching condition of the first cell or a ranking of the first cell in a plurality of cells, wherein the plurality of cells are cells to which the terminal device is capable of attempting a lower layer switch.

5. The method according to claim 1, wherein the second information is carried in one or more of the following messages: a switch configuration message, a switch command, or a switch indication.

6. The method according to claim 1, wherein a cell to which the terminal device preferentially attempts to switch is a cell having a high priority in the plurality of cells.

7. The method according to claim 6, wherein a priority associated with the first cell is determined according to one or more of the following information:
   whether switching to the first cell requires performing a layer 2 reset;
   a signal strength of the first cell; or
   a ranking of the first cell in the plurality of cells included in the second information.

8. The method according to claim 1, wherein the method further comprises:
   sending, by the terminal device, third information;
   wherein the third information indicates that the terminal device has not performed the layer 2 reset before attempting to access the first cell, or that the terminal device has not performed the layer 2 reset before successfully accessing the first cell.

9. The method according to claim 8, wherein the third information is carried in one or more of: a media access layer control control element (MAC CE), a radio resource control (RRC) message, a message 3 (msg3), or a radio link control (RLC) status report.

10. A method for wireless communication, comprising:
    sending, by a network device, first information and second information to a terminal device, wherein the first information indicates whether the terminal device needs to perform a layer 2 reset in response to the terminal device switching to a first cell, wherein the second information includes information of a plurality of cells, and the plurality of cells includes the first cell and are cells to which the terminal device is capable of attempting a lower layer switch.

11. The method according to claim 10, wherein the first information is indicated by at least one of a conditional switching condition of the first cell or a ranking of the first cell in a plurality of cells, wherein the plurality of cells are cells to which the terminal device is capable of attempting a lower layer switch.

12. The method according to claim 10, wherein the second information is carried in one or more of the following messages: a switch configuration message, a switch command, or a switch indication.

13. The method according to claim 10, wherein a cell to which the terminal device preferentially attempts to switch is a cell having a high priority in the plurality of cells.

14. The method according to claim 13, wherein a priority associated with the first cell is determined according to one or more of the following information:
   whether switching to the first cell requires performing a layer 2 reset;
   a signal strength of the first cell; or
   a ranking of the first cell in the plurality of cells included in the second information.

15. A terminal device, comprising:
   at least one processor;
   one or more non-transitory computer-readable storage media coupled to the at least one processor and storing programming instructions for execution by the at least one processor, wherein the programming instructions, when executed, cause the terminal device to perform operations comprising:
      receiving second information, wherein the second information includes information of a plurality of cells, and the plurality of cells includes a first cell, the plurality of cells are cells to which the terminal device is capable of attempting a lower layer switch; and
      performing a layer 2 reset after the terminal device accesses a first cell successfully, wherein the first cell is a target cell in a lower layer switch.

16. The terminal device according to claim 15, wherein performing the layer 2 reset comprises:
   in response to determining that the layer 2 reset needs to be performed, performing the layer 2 reset.

17. The terminal device according to claim 16, wherein the operations further comprise:
   receiving first information, wherein the first information indicates whether the terminal device needs to perform the layer 2 reset in response to switching to the first cell.

18. The terminal device according to claim 17, wherein the first information is indicated by at least one of a conditional switching condition of the first cell or a ranking of the first cell in a plurality of cells, wherein the plurality of cells are cells to which the terminal device is capable of attempting a lower layer switch.

19. The terminal device according to claim 15, wherein the second information is carried in one or more of the following messages: a switch configuration message, a switch command, or a switch indication.

20. The terminal device according to claim 15, wherein a cell to which the terminal device preferentially attempts to switch is a cell having a high priority in the plurality of cells.

* * * * *